United States Patent
Kraft et al.

(10) Patent No.: US 7,962,465 B2
(45) Date of Patent: Jun. 14, 2011

(54) CONTEXTUAL SYNDICATION PLATFORM

(75) Inventors: Reiner Kraft, Gilroy, CA (US); Farzin Maghoul, Hayward, CA (US); Gray Norton, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 480 days.

(21) Appl. No.: 11/584,403

(22) Filed: Oct. 19, 2006

(65) Prior Publication Data

US 2008/0098026 A1     Apr. 24, 2008

(51) Int. Cl.
*G06F 7/00* (2006.01)
*G06F 17/30* (2006.01)

(52) U.S. Cl. ........................................... 707/706

(58) Field of Classification Search ............... 707/3, 10, 707/706; 701/200
See application file for complete search history.

(56) References Cited

U.S. PATENT DOCUMENTS

| | | | |
|---|---|---|---|
| 5,734,887 A | 3/1998 | Kingberg et al. | |
| 5,895,470 A * | 4/1999 | Pirolli et al. | 707/727 |
| 6,018,738 A * | 1/2000 | Breese et al. | 707/100 |
| 6,049,776 A * | 4/2000 | Donnelly et al. | 705/8 |
| 6,249,740 B1 * | 6/2001 | Ito et al. | 701/200 |
| 6,349,299 B1 * | 2/2002 | Spencer et al. | 707/10 |
| 6,564,209 B1 * | 5/2003 | Dempski et al. | 707/3 |
| 6,931,397 B1 * | 8/2005 | Sundaresan | 707/5 |
| 6,947,930 B2 * | 9/2005 | Anick et al. | 1/1 |
| 7,200,638 B2 * | 4/2007 | Lake | 709/206 |
| 7,421,426 B2 | 9/2008 | Berstis et al. | |
| 7,467,349 B1 | 12/2008 | Bryar et al. | |
| 2002/0103798 A1 | 8/2002 | Abrol et al. | |
| 2003/0074369 A1 | 4/2003 | Schuetze et al. | |
| 2006/0149710 A1 | 7/2006 | Koningstein et al. | |
| 2007/0150466 A1 | 6/2007 | Brave et al. | |
| 2008/0313119 A1 | 12/2008 | Leskovec et al. | |

(Continued)

FOREIGN PATENT DOCUMENTS

WO    WO 2004/114163 A2    12/2004

(Continued)

OTHER PUBLICATIONS

The Hyperwords Company, "The Hyperwords Project", located at http://www.hyperwords.net, retrieved on Jan. 15, 2007, copyright 2005/2006, 1 pg.

(Continued)

*Primary Examiner* — Greta L Robinson
*Assistant Examiner* — Jeffrey Chang
(74) *Attorney, Agent, or Firm* — Hickman Palermo Truong & Becker LLP

(57) ABSTRACT

Techniques are disclosed for automatically annotating a document to offer, to a viewer, a choice of operations that a user can take relative to identified entities to which the document refers, where the choice of operations offered in relation to each such entity is appropriate to and based on the types of that entity. In one embodiment of the invention, for each "interesting" entity within a document, a mechanism automatically determines one or more types for that entity. The mechanism automatically annotates the document so that an application will present entity-type-specific data (including operation choices) that is generated by modules that are mapped to the types of the entities within the document. The annotations comprise metadata that indicates types of each "interesting" entity. The entity-type-specific data may be presented along with the rest of the document. A user need not navigate to a different document prior to viewing the data.

20 Claims, 4 Drawing Sheets

U.S. PATENT DOCUMENTS

| | | |
|---|---|---|
| 2009/0125544 A1 | 5/2009 | Brindley |
| 2009/0265338 A1 | 10/2009 | Kraft et al. |
| 2010/0083105 A1 | 4/2010 | Channabasavaiah |

FOREIGN PATENT DOCUMENTS

| | | |
|---|---|---|
| WO | WO 2005/050491 A1 | 6/2005 |

OTHER PUBLICATIONS

Vibrant Media, "IntelliTXT Words Engage", located at http://www.intellitxt.com, retrieved on Jan. 15, 2007, copyright 2006, 1 pg.

Korean Intellectual Property Office, "International Search Report", International application No. PCT/US2007/081421, dated Mar. 27, 2008, 13 pages.

Claims, International application No. PCT/US2007/081421, 4 pages.

Maglio, P et al., "LiveInfo: Adapting web experience by customization and annotation". In Proceedings of the $1^{st}$ International Conference on Adaptive Hypermedia and Adaptive Web-based Systems, AH2000, Trento, Italy, Aug. 2000 (10 pages).

D1: Finkelstein, L. et al., "Placing Search in Context: The Concept Revisited" 2002 ACM (18 pages).

D2: Sugiyama, K. et al., "Adaptive Web Search Based on User Profile Constructed without Any Effort from Users" WWW2004, May 17-22, 2004 (12 pages).

Chinese Office Action received in Application serial No. 200580032112.4 dated Oct. 28, 2010 (27 pages).

Current Claims in Application serial No. 200580032112.4, Dec. 2010 (5 pages).

\* cited by examiner

CONTEXTUAL SYNDICATION PLATFORM

CROSS-REFERENCE TO RELATED APPLICATIONS

The present application is related to the following U.S. patent applications, each of which is incorporated by reference herein:

U.S. patent application Ser. No. 10/903,283, filed Jul. 29, 2004, titled "SEARCH SYSTEMS AND METHODS USING IN-LINE CONTEXTUAL QUERIES;"

U.S. patent application Ser. No. 11/033,417, filed Jan. 10, 2005, titled "USER INTERFACES FOR SEARCH SYSTEMS USING IN-LINE CONTEXTUAL QUERIES;"

U.S. patent application Ser. No. 11/033,100, filed Jan. 10, 2005, titled "SEARCH SYSTEMS AND METHODS USING ENHANCED CONTEXTUAL QUERIES;"

U.S. patent application Ser. No. 11/033,101, filed Jan. 10, 2005, titled "USER INTERFACE TOOL FOR TEXT SELECTION;"

U.S. patent application Ser. No. 11/129,096, filed May 12, 2005, titled "SYSTEM AND METHOD FOR CONTEXTUAL TRANSACTION PROPOSALS;"

U.S. patent application Ser. No. 11/183,114, filed Jul. 14, 2005, titled "User ENTERTAINMENT AND ENGAGEMENT ENHANCEMENTS TO SEARCH SYSTEM;"

U.S. patent application Ser. No. 11/231,632, filed Sep. 20, 2005, titled "SYSTEMS AND METHODS FOR PRESENTING INFORMATION BASED ON PUBLISHER-SELECTED LABELS;"

U.S. patent application Ser. No. 11/232,270, filed Sep. 20, 2005, titled "SYSTEMS AND METHODS FOR PRESENTING ADVERTISING CONTENT BASED ON PUBLISHER-SELECTED LABELS;"

U.S. patent application Ser. No. 11/239,708, filed Sep. 29, 2005, titled "TAGGING OFFLINE CONTENT WITH CONTEXT-SENSITIVE SEARCH-ENABLING KEYWORDS;"

U.S. patent application Ser. No. 11/239,729, filed Sep. 29, 2005, titled "AUTOMATICALLY DETERMINING TOPICAL REGIONS IN A DOCUMENT;"

U.S. patent application Ser. No. 11/248,738, filed Oct. 11, 2005, titled "ENABLING CONTEXTUALLY PLACED ADS IN PRINT MEDIA;" and U.S. patent application Ser. No. 11/270,917, filed Nov. 10, 2005, titled "WORD SENSE DISAMBIGUATION."

FIELD OF THE INVENTION

The present invention relates to document annotation and enhancement and, more specifically, to a technique for automatically annotating and enhancing a document to offer, to a viewer of the document, a choice of operations that a user can take relative to identified entities to which the document refers, where the choice of operations offered in relation to each such entity is appropriate to and based on the types of that entity.

BACKGROUND

U.S. patent application Ser. No. 10/903,283, filed on Jul. 29, 2004, discloses techniques for performing context-sensitive searches. According to one such technique, a "source" web page may be enhanced with user interface elements that, when activated, cause a search engine to provide search results that are directed to a particular topic to which at least a portion of the "source" web page pertains. For example, such user interface elements may be "Y!Q" elements, which now appear in many web pages all over the Internet. For additional information on "Y!Q" elements, the reader is encouraged to submit "Y!Q" as a query term to a search engine.

Because they may be strategically positioned in a web page in close proximity to the content about which the user would want to search for information, the user interface elements described above provide a convenient mechanism for context-sensitive searching. A user can presume that, if he initiates a search using a user interface element that is positioned in close proximity to a particular paragraph of text, then the search results obtained for the search will be constrained based on the topics to which the paragraph pertains.

Beneficially, these user interface elements allow a user to search for resources that are related to a topic of interest within a web page that the user is currently viewing, at the time in which the user's interest in that topic is piqued. The user can locate related resources without redirecting his browser to a search engine portal page and, sometimes, without even formulating or typing any search query terms. Thus, these user interface elements enable the delivery of relevant information to a user at the point of the user's inspiration or curiosity.

If the user has the right kind of toolbar plug-in installed on his computer and associated with his Internet browser application (e.g., Mozilla Firefox), then the user may right-click on a word displayed within a web page in order to view a pop-up interface that provides the user with several options. For example, if the user right-clicks on a link in the page, then the user's Internet browser application may present, to the user, a pop-up interface that gives the user options for e-mailing the link to a user-specified e-mail address, sending the link to a user-specified Instant Messenger identity, adding the link to a set of bookmarks for future reference, or performing a search for relevant documents using terms within the link text as query terms. These options relate to activities that are applicable to all links, regardless of what those links represent.

To date, when such a pop-up interface is displayed, the options presented in the pop-up interface are the same regardless of the content of the text on which the user right-clicked. The activities that the user can take relative to a link on which the user right-clicked are the same regardless of the text of that link or the kind of thing that such text represents. As a result, the activities that the user can take are typically limited to more general activities that are applicable to entities of all kinds. Unfortunately, when the activities that can be performed relative to a link are only those that are of a generally applicable nature (i.e., applicable to all links regardless of what those links represent), many specific activities that the user might want to take relative to the link cannot be offered as options in the pop-up interface, because such specific activities might not be applicable to all links.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
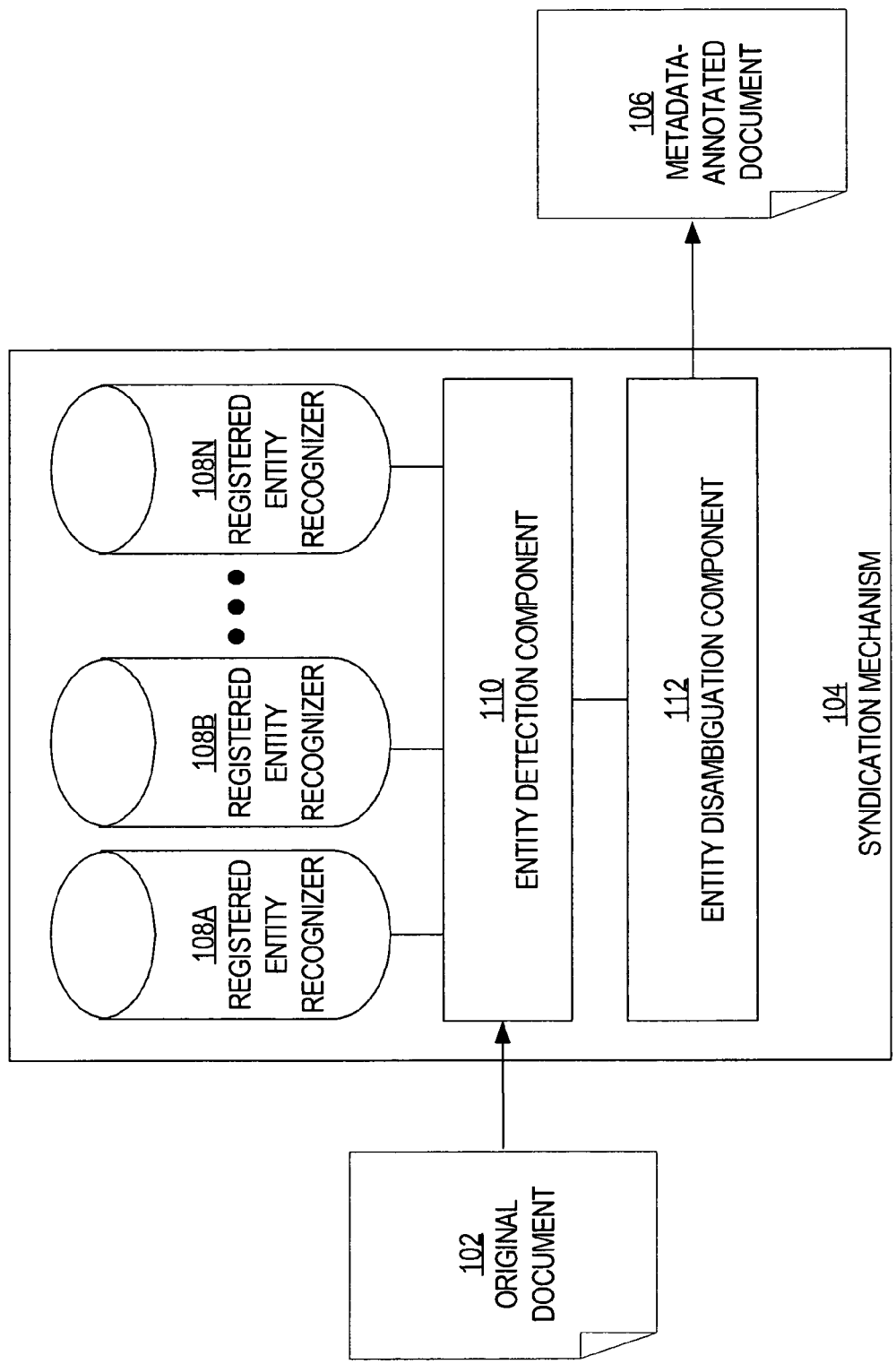
FIG. 1 depicts an example of a system in which an embodiment of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Documents (e.g., web pages) refer to entities (e.g., recognized people, places, things, etc.). Along with the rest of a document, operations, services, activities, and features that pertain to entities to which that document refers may be presented (e.g., in pop-up interfaces) to a user who is currently viewing that document. Embodiments of the invention enable type-specific operations, services, activities, and features to be presented in conjunction with entities that are of the appropriate type. The set of operations, services, activities, and features that are presented in conjunction with an entity that is of a particular type is customized to contain operations, services, activities, and features that are appropriate to entities of the particular type, but which might not be appropriate to entities of other types. For example, a map might be presented in conjunction with a "place" type entity, but not presented in conjunction with entities that are not of a "place" type. Thus, different sets of operations, services, activities, and features may be presented in conjunction with entities of different types.

Some embodiments of the invention further enable interested people and organizations to register, with a syndication mechanism or "platform," customized mappings between customized types and customized modules that may be selected by those interested people and organizations. Some or all of the selected types may be defined by the provider of the syndication mechanism, the party that registers the customized mappings, and/or other parties that previously defined and registered their own custom type definitions. Similarly, some or all of the selected modules may be defined by the provider of the syndication mechanism, the party that registers the customized mappings, and/or other parties that previously defined their own custom executable modules.

In one embodiment of the invention, for each entity within a document (e.g., a web page or e-mail message), the syndication mechanism automatically determines one or more types for that entity. The syndication mechanism automatically annotates the document so that an Internet browser (or other application) will present, in response to occurrences of specified events relative to entities to which the annotated document refers, entity-type-specific data that is generated by the modules that are mapped to the types of the entities relative to which the specified events occurred. The annotations in the document comprise metadata that indicates, for each entity, one or more types of that entity. The data may be presented along with the rest of the document (e.g., in a pop-up interface) so that a user does not need to navigate to a different document prior to viewing the data.

Annotating Documents

According to one embodiment of the invention, a syndication mechanism receives a document (e.g., a web page) as input. The syndication mechanism automatically identifies "interesting" entities (e.g., people, places, things, etc.) to which the document refers. Entities may be automatically identified using techniques described in U.S. patent application Ser. No. 10/903,283, for example. The syndication mechanism may rank these entities in order of importance. Using techniques described in U.S. patent application Ser. No. 11/270,917, for example, the syndication mechanism may disambiguate (i.e., determine the correct meaning of, given the contextual use of) entities that could have any of several meanings when not considered in context. The syndication mechanism annotates the entities in the document according to techniques described below. The syndication mechanism outputs an annotated document.

A content provider might have content which he considers to be valuable. For example, a content provider that operates a web site might have content that comprises his reviews of computer products. The content provider might want links to his content to be presented in conjunction with all entities that are classified as "electronics" type entities, because the content provider might believe that users who are interested in electronics would probably also be interested in the content provider's reviews of computer products.

Therefore, the content provider might register with the syndication mechanism in order to cause the syndication mechanism to make the content provider's content available to users who view documents (e.g., web pages) that refer to entities that are classified as "electronics" type entities. More specifically, the content provider might register with the syndication mechanism in order to cause the syndication mechanism to annotate documents with entity-type-expressing metadata so that the pop-up interfaces that users' Internet browsers (and/or other applications) display when those users right-click on (or "hover over," etc.) entities that are classified as "electronics" include links to the content provider's content.

After the content provider has registered with the syndication mechanism, the syndication mechanism might automatically detect that a particular document (e.g., a web page or e-mail message) refers to a particular entity that is a digital camera. Due to the particular entity being a digital camera, the syndication mechanism might classify this entity as being an "electronics" type of entity. In response to determining that the particular entity is an "electronics" type of entity, the syndication mechanism may annotate the particular document so that the particular document contains metadata that indicates that at least one of the particular entity's types is "electronics." This presence of this annotation causes the pop-up interfaces that users' Internet browsers (and/or other applications) display when those users right-click on (or "hover over," etc.) the particular entity to include links to the content provider's content.

Figure 3:
FIG. 3 is a diagram that illustrates an example of an annotated web page over which a pop-up interface for a particular entity has been temporarily overlaid, according to an embodiment of the invention.

FIG. 3 is a diagram that illustrates an example of an annotated web page over which a pop-up interface for a particular entity has been temporarily overlaid, according to an embodiment of the invention. In web page 302, the interesting entity "Madonna" has been automatically identified and highlighted. Because a user has right-clicked on the text of this entity, pop-up interface 304 has been overlaid over a portion of web page 302. Pop-up interface 304 contains several tabs—in this example, one for "web," one for "news," and one for "image." The "news" tab is currently selected. Consequently, pop-up interface 304 currently displays current news results for the entity "Madonna."

Entity Type-Specific Operation Options and Features

In addition to links to content providers' related content, pop-up interfaces may contain user-selectable options that correspond to activities or operations that can be performed relative to the entities for which those pop-up interfaces are displayed. In one embodiment of the invention, the syndication mechanism annotates a document so that the user-selectable options that such pop-up interfaces contain are customized based on the types of the entities for which those pop-up interfaces are displayed.

For example, in response to determining that a particular entity is a "place" type entity, the syndication mechanism may annotate the particular entity-containing document so that the pop-up interface that is displayed for the entity contains an option which, when selected, causes an Internet browser to request and display a page that contains a map of the area surrounding the place represented by the particular entity. Alternatively, in response to making such determination, the syndication mechanism may annotate the particular entity-containing document so that the pop-up interface that is displayed for the particular entity actually contains a map of the area surrounding the place represented by the particular entity. The syndication mechanism may annotate documents so that such place-specific options and features are only included within pop-up interfaces that are displayed for "place" type entities. Such place-specific options and features would not make sense if displayed in a pop-up interface for an entity that is not a place.

For another example, in response to determining that a particular entity is an "e-mail address" type entity, the syndication mechanism may annotate the particular entity-containing document so that the pop-up interface that is displayed for the entity contains an option which, when selected, causes an e-mail client application to launch and add, to a list of e-mail addresses, the e-mail address that the particular entity represents. The syndication mechanism may annotate documents so that such e-mail address-specific options and features are only included within pop-up interfaces that are displayed for "e-mail address" type entities. Such e-mail address-specific options and features would not make sense if displayed in a pop-up interface for an entity that is not an e-mail address.

For another example, in response to determining that a particular entity is a "movie" type entity, the syndication mechanism may annotate the particular entity-containing document so that the pop-up interface that is displayed for the entity contains a short audiovisual clip of a preview of the movie that the particular entity represents. The syndication mechanism may annotate documents so that such movie-specific options and features are only included within pop-up interfaces that are displayed for "movie" type entities. Such e-mail address-specific options and features would not make sense if displayed in a pop-up interface for an entity that is not a movie.

Web Service and Javascript Implementation

In one embodiment of the invention, the syndication mechanism described above is implemented as a web service that receives a web page (or other document) as input from a publisher. The web service automatically identifies entities in the web page and annotates the web page with metadata that indicates, for each of those entities, one or more identified types of those entities. In one embodiment of the invention, the providers of the web service provide a JavaScript library to the publisher. The publisher puts the JavaScript library into his web page template. The publisher "flows" the annotated web page into his web page template. The JavaScript library consumes the entity-type-expressing annotations in the annotated web page.

The JavaScript library is responsible for visually highlighting identified entities within the web page. The JavaScript library is also responsible for displaying, to a user, pop-up interfaces or overlays that present operations, services, activities, and/or features that are mapped to the types of the entities in the web page. The operations, services, activities, and/or features that are to be presented in a particular pop-up interface for a particular entity are determined based on the type(s) of the particular entity as expressed in the annotations for the particular entity.

Entity Types

In one embodiment of the invention, each entity may have one or more entity types. For example, an entity might be of type "person," "place," "street address," "e-mail address," "telephone number," "uniform resource locator," etc. Entities that have a general type such as "person" might also have more specific types such as "musician," "actor," "celebrity," "politician," etc.

In one embodiment of the invention, the set of entity types is arranged in a taxonomy or hierarchy of entity types in which some types are sub-types of other types. For example, the "actor" and "celebrity" entity types might be sub-types of the "person" entity type. For another example, the "city" entity type might be a sub-type of the "place" entity type. In such an embodiment of the invention, if an entity has an entity type that is a sub-type of another entity type, then that entity also has that other entity type. Thus, in one embodiment of the invention, all entities that have the "actor" type also have the "person" type, but entities that have the "person" type do not necessarily have the "actor" type or any other type.

In one embodiment of the invention, several different entity type hierarchies may be registered with the same syndication mechanism. It is possible that the designers of these different hierarchies might not be familiar with the other type hierarchies that are already registered with the syndication mechanism; as a result, one type hierarchy designer might give one of his types the same name that was given to a type in a type hierarchy registered by another type hierarchy designer. In order to avoid confusion and type name "collisions," in one embodiment of the invention, each separate type hierarchy is associated with a unique namespace identifier. This namespace identifier may precede and qualify the type(s) of the entities as represented in annotation metadata. For example, in the metadata added to a document through the annotation process described above, one of a particular entity's types might be represented as "<shortcuts:/person/actor>," where "shortcuts" is the namespace identifier for the type hierarchy that includes the "person" and "actor" types. Other type hierarchies that include "person" and "actor" types may be distinguished by different namespace identifiers.

Dictionaries

In one embodiment of the invention, one or more "dictionaries" are registered with the syndication mechanism. Each dictionary comprises one or more mappings between terms and types in a specified type hierarchy. For example, in one dictionary, the term "Tom Cruise" might be mapped to "<shortcuts:/person/actor>" and "<shortcuts:/person/celebrity>." For another example, the term "Hollywood, CA." might be mapped to "<shortcuts:/place/city>." Some dictionaries may be provided as "built-in" aspects of the syndication mechanism. Other dictionaries may be received from content providers (such as web publishers) who register their own customized dictionaries with the syndication mechanism. For example, a publisher of content on the Internet might register, with the syndication mechanism, a dictionary that maps each interesting (in the publisher's opinion) term in his published content to one or more entity types from one or more entity type hierarchies (potentially including the publisher's own customized entity type hierarchy and/or the customized entity type hierarchies of other publishers).

A content provider (e.g., a publisher) may select, from among multiple currently registered dictionaries (the content provider's own or others), a specified set of dictionaries that the content provider would like the syndication mechanism to use to identify interesting entities in the content provider's documents. Different content providers may select different sets of dictionaries. In one embodiment of the invention, the syndication mechanism uses a "default" set of dictionaries to identify interesting terms in the content provider's document unless the content provider expressly indicates, to the syndication mechanism, that one or more of these dictionaries should not be used and/or that one or more additional dictionaries not in the "default" set also should be used.

In one embodiment of the invention, while the syndication mechanism is annotating a content provider's document, the syndication mechanism attempts to locate a term from that document within the set of registered dictionaries that the content provider specified. For each such dictionary in which the syndication mechanism locates the term, the syndication mechanism places, within the document, metadata that identifies the entity type that is mapped to that term in that dictionary. The syndication mechanism might locate the term in multiple separate dictionaries and place, within the document, metadata that identifies different entity types that are mapped to those terms within the separate dictionaries. The syndication mechanism may perform this process for each term within the document, where each term may comprise one or more words. Thus, in one embodiment of the invention, the syndication mechanism uses the information contained in the registered dictionaries (potentially in combination with other information) in order to identify and classify the interesting entity-correspondent terms within a document.

In addition to information contained within registered dictionaries, the syndication mechanism may use other sources and techniques in order to identify interesting entities within a document. For example, the syndication mechanism may use rule-based processes to identify interesting entities automatically. For another example, the syndication mechanism may use machine-learning-based techniques to identify interesting entities automatically.

Modules

In one embodiment of the invention, each entity type is mapped to one or more modules. Modules may be implemented as executable computer programs and/or as web pages that contain browser-executable script, for example. Additionally or alternatively, modules may be implemented as metadata that an interpreting program uses to provide functionality that is specified by the metadata.

A particular entity type may be mapped to more than one module, and a particular module may be mapped to more than one entity type. For example, two or more different entity types might each be mapped to a "search" module. The "search" module might have functionality that causes a pop-up interface to display, among other features, one or more Internet search results that a search engine selected using the entity's text as search query terms. As a result of such mappings, when a pop-up interface is displayed for a particular entity that has at least one type that is mapped to the "search" module, that pop-up interface will contain at least the search results produced by the "search" module. Pop-up interfaces that are displayed for entities that do not have any types that are mapped to the "search" module will lack the search results that would have been produced by the "search" module.

Different modules may offer different functionality. For example, while a "search" module might cause a pop-up interface to contain search results, a "map" module (which might be mapped only to certain entity types such as "place" and other entity types that are representative of a location) might cause a pop-up interface to contain a map that the "map" module dynamically generated. For another example, a "shopping" module (which might be mapped only to certain entity types such as "product" and other entity types that are representative of things that can be purchased) might cause a pop-up interface to contain links which, when selected, cause corresponding items to be added to an "on-line shopping cart" for an Internet site that sells such items. For another example, a "photo" module (which might be mapped to "person," "animal," and "edifice" entity types, for example) might cause a pop-up interface to contain a digitized image (e.g., an image of the specific person, animal, or edifice that the corresponding entity represents).

As is discussed above, a content provider may register customized modules with the syndication mechanism. The modules may be of the content provider's own design. In one embodiment of the invention, the syndication mechanism receives, from a content provider, both a module (or several modules) and a set of specified mappings between that module (or modules) and one or more entity types. For example, a content provider might register, with the syndication mechanism, a "product review" module that causes reviews of computer products to be downloaded automatically from a specified server and included within a pop-up interface. If the content provider additionally registered a mapping between the "product review" module and an "electronics" entity type, then the pop-up interfaces presented for all entities that had the "electronics" entity type would include the reviews of the computer products downloaded form the specified server.

A content provider also may register mappings that involve "built-in" modules provided by the syndication mechanism and/or mappings that involve customized modules that were registered with the syndication mechanism by other content providers.

In one embodiment of the invention, mapping a module to an entity type that is a sub-type of another entity type does not, as a result, map that module to that other entity type. For example, if the "actor" type was a sub-type of the "person" type, then mapping a particular module to the "actor" type would not also consequently map the particular module to the "person" type. Following this example further, a pop-up interface generated for an entity that was of the "actor" type would include operations, services, activities, and/or features resulting from the functionality of the particular module, but a pop-up interface generated for an entity that was of the "person" but not the "actor" type would not necessarily include any operations, services, activities, and/or features resulting from the functionality of the particular module.

In one embodiment of the invention, a publisher or other content provider registers his customized modules, dictionaries, and/or customized entity type hierarchies with the syndication mechanism by uploading these modules, dictionaries and/or entity type hierarchies to the syndication mechanism via the Internet. For example, the syndication mechanism may provide a web-based interface through which a content provider can upload such data. The operator of the syndication mechanism may charge the content provider a specified fee in exchange for the registration of the modules, dictionaries, and/or entity type hierarchies.

Entity Type-Influenced Metadata Content

As is discussed above, the metadata that is inserted into a copy of a document in the process of annotating the document indicates one or more entity types for the entity to which that metadata pertains. In one embodiment of the invention, additional information, besides the entity types of an entity, may be placed into the metadata for that entity. The kind of additional information that is placed into the metadata for the entity may be influenced by (although not necessarily exclusive to) that entity's type.

For one example, in one embodiment of the invention, if an entity's type is determined to be "person," then, along with information that indicates that the entity's type is "person," the metadata for that entity also indicates the year in which the person represented by the entity was born, if such information is known or available. For another example, in one embodiment of the invention, if an entity's type is determined to be "city," then, along with information that indicates that the entity's type is "city," the metadata for that entity also indicates (a) the latitude of the city that the entity represents, (b) the longitude of the city that the entity represents, and (c) the area of the city that the entity represents, if such information is known or available. This additional information may be used by the modules that are mapped to the "city" entity type. For example, such a module might use this information to dynamically generate a map of the city and the surrounding area for display within a pop-up interface.

Additionally or alternatively, at least some of the modules that are selected to present operations, services, activities, and/or features for a particular entity may be selected based on such entity type-influenced additional information that is present in the metadata for that particular entity. For example, if the latitude and longitude indicated within an entity's metadata indicate that the location represented by the entity is within North America, then a special "North America" module might be selected to present, within a pop-up interface for the entity, operations, services, activities, and features that are especially appropriate for locations within North America—regardless of the entity's type.

For another example, if a top-level domain indicated within an entity's metadata indicates that a web site represented by the entity is a site at "Yahoo!", then a special "Yahoo!" module might be selected to present, within a pop-up interface for the entity, operations, services, activities, and features that are especially appropriate for "Yahoo!" web sites—regardless of the entity's type.

In one embodiment of the invention, two or more different entity types—even types that are unrelated to each other in any entity type hierarchy—may have the same fields of additional information placed in the metadata for entities of each of those types. Therefore, although an entity's type may influence which fields of additional information (if any) are included in the metadata for that entity, there is not necessarily a one-to-one correspondence between an entity's type and the additional information (beyond the entity's type) that is included in the metadata for that entity.

Presentation Alternatives

As is discussed above, in one embodiment of the invention, the entity-type-specific operations, services, activities, and features that are displayed for a particular entity are presented within a pop-up interface that at least temporarily overlays a portion of the currently displayed document in response to a user's performance of a specified action relative to the particular entity (e.g., when the user right-clicks on the entity's text or "hovers" the mouse pointer over the entity's text for a specified period of time). However, in an alternative embodiment of the invention, these entity-type-specific operations, services, activities, and features may be displayed within a document even without the performance of any user action relative to any entity.

For example, prior to the time that a document is displayed by an Internet browser or other application, entity-type-specific operations, services, activities, and/or features may be placed within a header, footer, or sidebar portion of the document. For example, if one of the entities to which the document refers has at least a "place" type, then the header, footer, or sidebar portion of the document may contain a dynamically generated "thumbnail" map that shows an area that surrounds the place that the entity represents. For another example, if one of the entities to which the document refers has at least an "e-mail address" type, then the header, footer, or sidebar portion of the document may contain a user-selectable option which, when selected, causes the performance of an operation that adds, to an e-mail address list of the user's e-mail application, an e-mail address that the entity represents. This header, footer, or sidebar portion may be displayed along with the document's original contents. Such a header, footer, or sidebar portion may contain entity-type-specific operations, services, activities, and/or features for multiple separate entities that have been identified within the document.

Example System

FIG. 1 depicts an example of a system in which an embodiment of the invention may be implemented. FIG. 1 shows a document 102, a syndication mechanism 104, and an annotated document 106. Syndication mechanism 104 receives document 102 as input and annotates document 102 with metadata to produce annotated document 106 as output.

Syndication mechanism 102 comprises a set of registered entity recognizers 108A-N, an entity detection component 110, and an entity disambiguation component 112. In one embodiment of the invention, the set of registered entity recognizers 108A-N includes one or more sets of registered dictionaries (each specifying one or more term-to-entity type mappings) that were received from one or more content providers (e.g., publishers of documents such as document 102).

In one embodiment of the invention, entity detection component 110 automatically identifies, within document 102, entities that are specified within the set of registered entity recognizers 108A-N. Each entity comprises one or more terms. For each such identified entity in document 102, entity disambiguation component 112 determines a correct context (i.e., meaning) of that entity—some sets of terms might have more than one meaning. Entity disambiguation component 112 may determine the correct context of an entity using techniques disclosed in U.S. patent application Ser. No. 11/270,917, for example. An entity's identity may be expressly qualified with that entity's context.

Once a correct context has been determined for each identified entity, syndication mechanism 104 creates an annotated copy of document 102 by inserting, into the copy, metadata that indicates, for each identified entity, one or more entity types of that entity. As is discussed above, the entity types of each entity may be automatically determined based on registered mappings between entities and entity types—in one embodiment of the invention, these mappings are specified within entity recognizers 108A-N.

The metadata inserted into the copy of document 102 may take the form of one or more tags, each of which identifies an entity within document 102 and one or more entity types of that entity. Syndication mechanism 104 outputs the copy, including the tags, as annotated document 106. As is described above, the metadata within annotated document 106 may be used by other mechanisms to generate pop-up interfaces that present operations, services, activities, and/or features that are appropriate for the entity types specified within the metadata. The operations, services, activities, and/or features presented may be selected based on a specified set of entity type-to-module mappings, as is discussed above.

Example Flow

Figure 2:
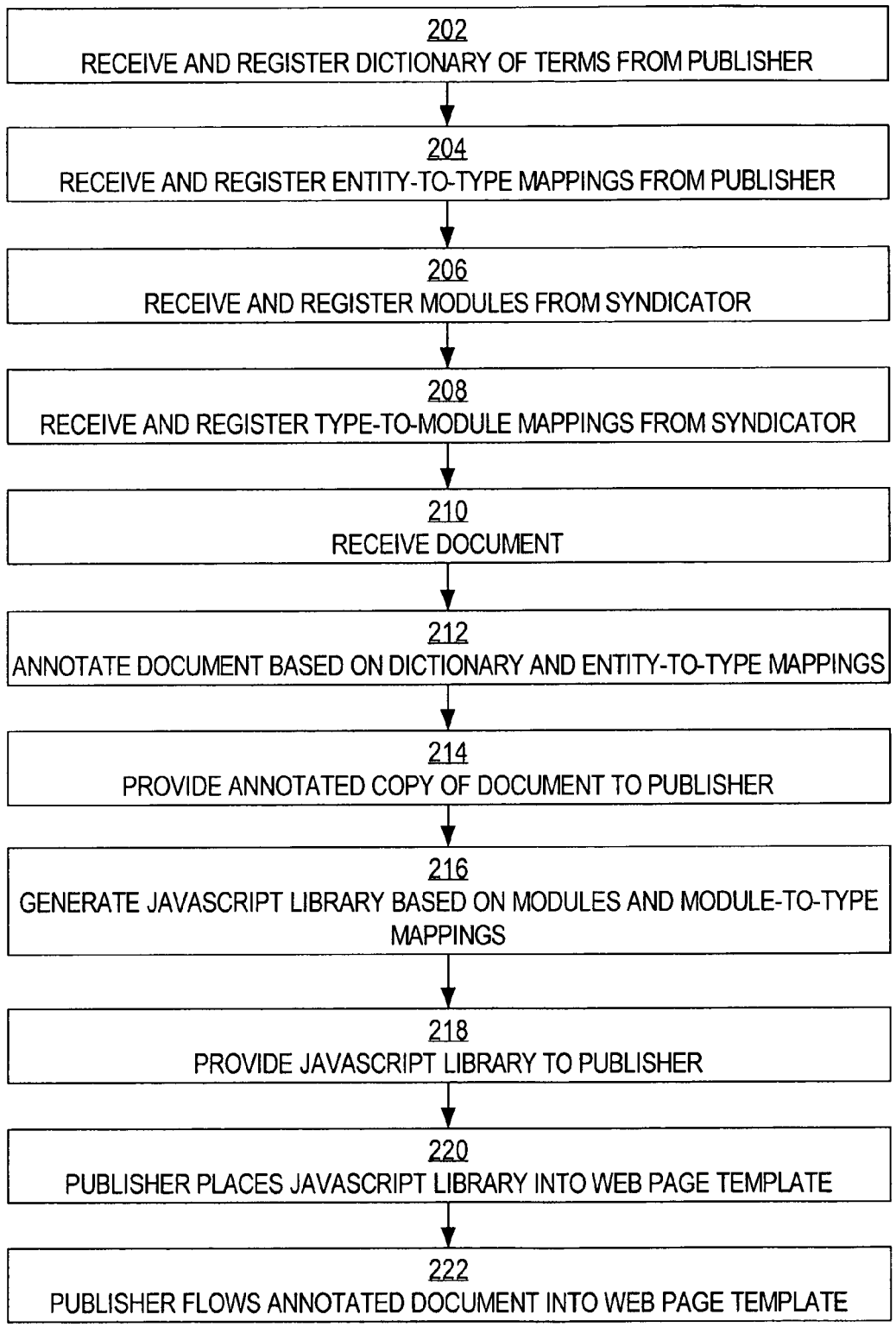
FIG. 2 is a flow diagram that illustrates an example of the operation of a syndication mechanism, in accordance with an embodiment of the invention.

FIG. 2 is a flow diagram that illustrates an example of the operation of a syndication mechanism, in accordance with an embodiment of the invention. In block 202, a dictionary of terms is received from a publisher and registered with the syndication mechanism. In block 204, a set of entity-to-entity type mappings is received from the publisher and registered with the syndication mechanism. In block 206, a set of modules is received from a syndicator and registered with the syndication mechanism. The syndicator may be a different person or organization than the publisher. In block 208, a set of entity type-to-module mappings is received from the syndicator and registered with the syndication mechanism.

In block 210, the syndication mechanism receives a document (e.g., from the publisher). In block 212, the syndication mechanism annotates the document based at least in part on the dictionary and the set of entity-to-entity type mappings, thereby producing an annotated document that specifies, for each "interesting" entity in the document, one or more entity types of that entity. In block 214, the syndication mechanism provides the annotated document to the publisher.

In block 216, the syndication mechanism generates a JavaScript library based at least in part on the set of modules and the set of entity type-to-module mappings. In block 218, the syndication mechanism provides the JavaScript library to the publisher. In block 220, the publisher places the JavaScript library into a web page template. In block 222, the publisher "flows" the annotated document into the web page template, which, based at least in part on the modules and the entity type-to-module mappings, produces a document that contains JavaScript which, when interpreted by an Internet browser application, will cause the Internet browser application to present entity-type-appropriate selections of options, services, and/or features for each "interesting" entity in the document in response to occurrences of specified events relative to those entities.

Entities Within Search Query Terms

As is discussed above, in one embodiment of the invention, a user's actions relative to an entity identified within a document (e.g., right-clicking on the entity's text or "hovering" a mouse pointer over the entity's text) cause an application such as an Internet browser to display a pop-up interface that presents features and/or selectable options that are appropriate for the specific type(s) of that entity. In one embodiment of the invention, the pop-up interface includes, for entities of at least some specified types, a search interface that includes a field into which a user can input one or more search query terms.

In one embodiment of the invention, in response to such search query terms being received as input into such a search interface, one or more entities represented by those query terms are automatically identified using techniques similar to those described above for identifying interesting entities within a document. After the interesting entities within the query terms have been identified, one or more entity types of each of those entities are automatically identified using the techniques described above for determining entities' types. Then, based on mappings between modules and the entities' types, the display of the pop-up interface is responsively enhanced to include additional features and/or options that are appropriate for the types of the entities identified within the query terms.

In a pop-up interface, each module that is mapped to at least one of the identified entities' types may correspond to a separate "tab" shown in a "tab bar" that may be presented across the top of the pop-up interface. For example, a "tab bar" might include side-by-side tabs for a "search" module, a "map" module, and a "movie module." Clicking on the tab for the "search" module might cause one or more search results (produced based on the query terms) to be displayed in the pop-up interface. Clicking on the tab for the "map" module might cause a map of an area surrounding a location represented by an entity in the query terms to be displayed in the pop-up interface. Clicking on the tab for the "movie" module might cause an audiovisual clip of a preview of a movie represented by an entity in the query terms to be displayed in the pop-up interface.

Thus, using a multi-tabbed pop-up interface, a user might navigate back-and-forth between different categories of entity type-specific features and options. While the user is doing this, the original document, or at least a portion thereof, may remain visible to the user.

Hardware Overview

Figure 4:
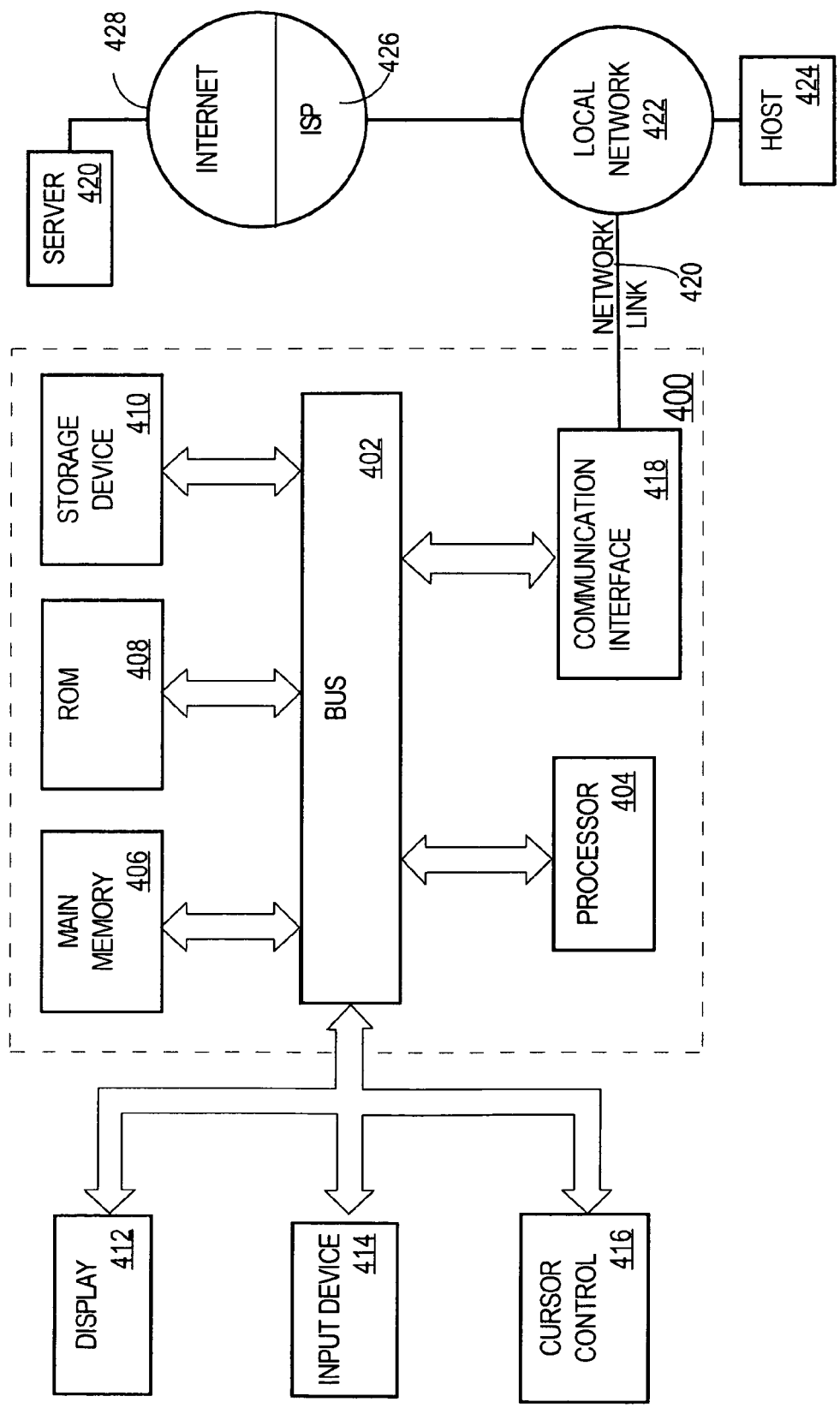
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
  receiving a document that contains a set of terms that correspond to entities;
  based at least in part on the set of terms, automatically identifying one or more entities whose identities the document contains; and
  for each particular entity of the one or more entities, performing steps comprising:
    based at least in part on a set of entity-to-type mappings, automatically determining one or more types of the particular entity;
    based at least in part on the one or more types of the particular entity, generating, for the document, metadata that indicates the one or more types of the particular entity; and storing the metadata on a volatile or non-volatile computer-readable storage medium;

based at least in part on the metadata, generating script which, when executed by an application, causes the application to present, to a user, one or more items that are based on the one or more types of an entity of the one or more entities;

wherein generating the script further comprises:

determining one or more modules that are mapped to the one or more types of said entity of the one or more entities; and generating the script based on functionality that is specified by the one or more modules;

wherein the one or more modules are contained in a set of modules that includes at least a first module and a second module;

wherein the one or more types are contained in a set of types that includes at least a first type and a second type;

wherein multiple types in the set of types are mapped to the first module;

wherein multiple types in the set of types are mapped to the second module;

wherein the first type, but not the second type, is mapped to the first module;

wherein the second type, but not the first type, is mapped to the second module;

wherein the one or more types include at least one of the first type and the second type;

wherein the steps are performed by one or more computing devices.

2. The method of claim 1, further comprising:

determining, based on the metadata, that at least one type of an entity of the one or more entities is a place type; and in response to determining that said at least one type is a place type, generating script which, when executed by an application, causes the application to present, to a user, a map that shows an area surrounding a location that is represented by said entity of the one or more entities.

3. The method of claim 1, further comprising:

determining, based on the metadata, that at least one type of an entity of the one or more entities is an e-mail address type; and in response to determining that said at least one type is an e-mail address type, generating script which, when executed by an application, causes the application to present, to a user, an option for adding, to a list of e-mail addresses, a particular e-mail address that is represented by said entity of the one or more entities.

4. The method of claim 1, further comprising:

receiving said document over a network at a web service.

5. The method of claim 1, wherein said entity-to-type mappings represent one or more mappings between one or more entities and one or more types within a type hierarchy in which some types are sub-types of other types.

6. The method of claim 1, further comprising:

inserting said metadata into a copy of said document.

7. A volatile or non-volatile computer-readable storage medium that stores instructions which, when executed by one or more processors, cause the one or more processors to perform the method of claim 1.

8. A volatile or non-volatile computer-readable storage medium that stores instructions which, when executed by one or more processors, cause the one or more processors to perform the method of claim 2.

9. A volatile or non-volatile computer-readable storage medium that stores instructions which, when executed by one or more processors, cause the one or more processors to perform the method of claim 3.

10. A volatile or non-volatile computer-readable storage medium that stores instructions which, when executed by one or more processors, cause the one or more processors to perform the method of claim 4.

11. A volatile or non-volatile computer-readable storage medium that stores instructions which, when executed by one or more processors, cause the one or more processors to perform the method of claim 5.

12. A volatile or non-volatile computer-readable storage medium that stores instructions which, when executed by one or more processors, cause the one or more processors to perform the method of claim 6.

13. The method of claim 1, wherein the document is a web page that contains markup language.

14. The method of claim 1, wherein the first type is mapped to the first module, and the second type is mapped to the second module, in a set of specified mappings that a syndication mechanism received from a content provider that registered the set of specified mappings with the syndication mechanism.

15. The method of claim 14, wherein the first module was registered with the syndication mechanism by the content provider; wherein the second module was not registered with the syndication mechanism by the content provider.

16. A volatile or non-volatile computer-readable storage medium that stores instructions which, when executed by one or more processors, cause the one or more processors to perform the method of claim 13.

17. A volatile or non-volatile computer-readable storage medium that stores instructions which, when executed by one or more processors, cause the one or more processors to perform the method of claim 14.

18. A volatile or non-volatile computer-readable storage medium that stores instructions which, when executed by one or more processors, cause the one or more processors to perform the method of claim 15.

19. A computer-implemented method comprising:

receiving a set of terms that correspond to entities;

based at least in part on the set of terms, automatically identifying one or more entities to which a document refers; and for each particular entity of the one or more entities, performing steps comprising:

based at least in part on a set of entity-to-type mappings, automatically determining one or more types of the particular entity;

based at least in part on the one or more types of the particular entity, generating, for the document, metadata that indicates the one or more types of the particular entity; and storing the metadata on a volatile or non-volatile computer-readable storage medium;

based at least in part on the metadata, generating script which, when executed by an application, causes the application to present, to a user, one or more items that are based on the one or more types of an entity of the one or more entities; wherein the script, when executed by the application, causes the application to overlay at least a portion of the document with an interface that contains the one or more items;

wherein the one or more items include a map that indicates a location of an entity that the user selected in the document;

wherein the entity that the user selected in the document is one of the one or more entities; and wherein the steps are performed by one or more computing devices.

20. A volatile or non-volatile computer-readable storage medium that stores instructions which, when executed by one or more processors, cause the one or more processors to perform the method of claim 19.

* * * * *